United States Patent [19]
Ebcioglu et al.

[11] Patent Number: 5,799,179
[45] Date of Patent: Aug. 25, 1998

[54] HANDLING OF EXCEPTIONS IN SPECULATIVE INSTRUCTIONS

[75] Inventors: Kemal Ebcioglu, Somers; Gabriel Mauricio Silberman, Millwood, both of N.Y.

[73] Assignee: International Business Machines Corporation, Armonk, N.Y.

[21] Appl. No.: 377,563

[22] Filed: Jan. 24, 1995

[51] Int. Cl.$^6$ ............................................. G06F 9/00
[52] U.S. Cl. ................................. 395/581; 395/392
[58] Field of Search ............................ 395/375, 800, 395/581, 392

[56] References Cited

U.S. PATENT DOCUMENTS

| | | | |
|---|---|---|---|
| 4,539,635 | 9/1985 | Boddie et al. | 395/581 |
| 5,299,318 | 3/1994 | Bernard et al. | 395/572 |
| 5,303,355 | 4/1994 | Gergen et al. | 395/588 |
| 5,421,022 | 5/1995 | McKeen et al. | 395/800.23 |
| 5,428,807 | 6/1995 | McKeen et al. | 395/392 |
| 5,479,616 | 12/1995 | Garibay et al. | 395/388 |
| 5,537,559 | 7/1996 | Kane et al. | 395/591 |
| 5,561,776 | 10/1996 | Popescu et al. | 395/586 |
| 5,584,001 | 12/1996 | Hoyt et al. | 395/585 |
| 5,592,636 | 1/1997 | Popescu et al. | 395/586 |
| 5,634,023 | 5/1997 | Adler et al. | 395/591 |
| 5,651,124 | 7/1997 | Shen et al. | 395/391 |

OTHER PUBLICATIONS

K. Ebcioglu, "Some Design Ideas for a VLIW Architecture for Sequential–Natured Software", Proc. IFIP WG10.3 Working Conf. on Parallel Processing, North Holland, 1988, pp. 3–21.

R. Cohn, T. Gross, M. Lam, and P.S. Tseng, "Architecture and Complier Tradeoffs for a Long Instruction Word Microprocessor," Proc. 3rd Intl Conf. on Architectural Support for Programming Languages and Operating Systems, Boston, MA, Apr. 1989, pp. 2–14.

R.P. Colwell et al., "A VLIW Architecture for a Trace Scheduling Complier," IEEE Transactions on Computers vol. 37, No. 8, Aug. 1988, pp. 967–979.

(List continued on next page.)

*Primary Examiner*—Parshotam S. Lall
*Assistant Examiner*—Kenneth R. Coulter
*Attorney, Agent, or Firm*—Perman & Green, LLP

[57] ABSTRACT

CPU overhead is minimized through tracking speculative exceptions (202) for later processing during exception resolution (204) including pointing to the addresses of these speculative instructions, and resolving (204) these exceptions by correcting (206) what caused the exception and re-executing (208) the instructions which are known to be in a taken path. Tracking speculative exceptions has two components which use an exception bit which is set in response to an exception condition (213). The invention tracks an original speculative exception which occurs when a speculative instruction whose operand(s) do not have any exception bits set encounters an exception condition. Speculative exception resolution is triggered when a non-speculative instruction—which is in the taken path of a conditional branch—uses an operand from a register having its exception bit set. The presence of an exception condition and a non-speculative instruction yields an exception signal (220) to exception resolution (204). Speculative exception resolution (204) includes responding to output signals from the extra register and extra exception bit for correcting (204) the exception condition which caused the exception and re-executing (208) the instructions which depended on the results of the instructions causing the speculative exception. This invention also handles the case where a speculative instruction attempts to use a register having its exception bit set as above.

59 Claims, 4 Drawing Sheets

OTHER PUBLICATIONS

R.D. Groves and R. Oehler, "An IBM Second Generation RISC Processor Architecture," Proc. IEEE Intl Conf. on Computer Design, Oct. 1989, pp. 134–137.

"Metaflow Targets SPARC and 386 with Parallel Architecture," Microprocessor Report, Dec. 1988.

T.S. Perry, "Intel's Secret is Out," IEEE Spectrum, vol. 26, No. 4, Apr. 1989, pp. 22–28.

J.E. Smith, "Dynamic Instruction Scheduling and the Astronauties ZS-1," IEEE Computer, vol. 22, No. 7, Jul. 1989, pp. 21–35.

M.D. Smith, M.S. Lam, and M.A. Horowitz, "Boosting Beyond Static Scheduling in a Superscalar Processor," Proc. 17th International Symp. on Computer Architecture, Seattle, WA, May 1990, pp. 344–354.

K. Ebcioglu and T. Nakatani, "A New Compiliation Technique for Parallelizing Loops with Unpredictable Branches on a VLIW Architecture," Proc. Workshop on Languages and Compliers for Parallelll Computing, Urbana, IL, MIT Press Research Monograph In Parallel and Distributed Computing, D. Gelernter et al, editors, Aug. 1989, pp. 213–229.

M.C. Golumbic and V. Rainish, "Instruction Scheduling Beyond Basic Blocks," IBM J. of Research and Development, vol. 34, No. 1, Jan. 1990, pp. 93–97.

K. Ekanadham and R. Rechtschaffen, "Speculation in Parallel Systems", IBM Technical Disclosure Bulletin, vol. 36, No. 09A, Sep. 1993, pp. 371–376.

T. Nakatani and K. Ebcioglu, "Using a Lookahead Window in a Compaction Based Parallelizing Complier," Proc. 23rd Workshop on Microprogramming and Microarchitecture, IEEE Computer Society Press, Nov. 1990, pp. 57–68.

K. Ebcioglu and R. Groves, "Some Global Complier Optimizations and Architectural Features for Improving Performance of Superscalars," Research Report RC 16145 IBM T.J. Watson Research Center, Feb. 1990.

K. Ekanadham and R. Rechtschaffen, "Metaparallelism-–Communication via Placeholders", IBM Technical Disclosure Bulletin, vol. 36, No. 09B, Sep. 1993, pp. 285–288.

T.N. Hicks, "Data Restoration of an Addressable Array", IBM Technical Disclosure Bulletin, vol. 35, No. 1A Jun. 1992, pp. 222–225.

J.E. Smith and A.R. Pleszkun, "Implementing Precise Interrupts in Pipelined Processors," IEEE Transactions on Computers, vol. 37, No. 5, May 1988, pp. 562–573.

David Bernstein, Michael Rodch, Mooly Sagiv, "Proving Safety of Speculative Load Instructions at Compile-Time", IBM Israel Scientific Center, Lecture Notes in Computer Science, 4th European Symposium on Programming Feb. 1992, pp. 56–72.

HANDLING OF EXCEPTIONS IN SPECULATIVE INSTRUCTIONS

TECHNICAL FIELD OF THE INVENTION

This invention relates to parallel processing of computer programs and, in particular, to the processing of speculative instructions.

BACKGROUND OF THE INVENTION

One method of improving CPU performance is to improve cycle time. One impediment to improving cycle time is the branch instruction. The branch instruction usually has to wait for the result of some instruction before it can decide on which path to take, either the "taken" (target) path or the "not taken" (sequential) path. The taken path consists of a sequence of instructions possibly including branches, some of which are taken branches, while others are not taken branches. Some architectures which support parallelism by pipelining and/or the use of multiple functional units allow instructions to be conditionally executed to increase the amount of available parallelism in an application. These 'speculative instructions' appear after conditional branch instructions for which the conditions have not yet been determined, and thus may or may not be in the actual path taken by subsequent program execution (the so-called taken path). The CPU guesses as to which path the branch is going to take. Once the guess is made, the CPU starts executing the path. If the guess is correct, there are no delays and the execution continues at full speed. If the guess is incorrect, the CPU begins executing the path that should have been taken and there is no worse of a delay in execution than if the guess was not made. Since their execution may not be required by the program, results from speculative instructions should not be committed until it can be determined whether they are in the taken path. Non-speculative instructions are in the taken path.

Speculative instruction scheduling is considered an important tool for moving instructions in a global context, beyond basic block boundaries.

As is the case with non-speculative instructions, exceptions such as page faults, arithmetic overflow and invalid addressing are also possible during speculative instruction execution. But, in the latter case, it is desirable to incur as little overhead as possible in handling each exception as it occurs since the speculative instruction may turn out to be outside of the taken path. On the other hand, if a speculative instruction causing an exception is found to be in the taken path, it is required to properly manage the exceptions and re-execute only those instructions which depend on their results. Furthermore, for those cases where the exception itself is "fatal" (for example, program execution is aborted), the CPU and memory contents should be precise. For example, an interrupt is precise if a saved process state corresponds to a sequential model of program execution where one instruction completes before the next begins and, therefore, the CPU and memory contents must be identical to the state reached by serial execution of the same program.

The architecture proposed by M. D. Smith, M. S. Lam, and M. A. Horowitz, "Boosting Beyond Static Scheduling in a Superscalar Processor," Proc. 17th Int'l Symposium on Computer Architecture, Seattle, Wash., May 1990, pp. 344–354 supports speculative instructions (called "boosted" instructions) by buffering their side effects by using "shadow" copies of a register file and memory store buffer (one such shadow copy is required for each conditional branch on which current speculative instructions may depend). The mechanism for handling exceptions is not explicitly stated, other than saying that they occur only when " . . . the boosted instruction attempts to commit." At this point, shadow structures are invalidated and all boosted instructions are re-executed, now as non-speculation instructions. Eventually, the instruction causing the exception will be re-executed, at which time the exception will be handled. No description is given of the actual hardware which keeps track of the boosted instructions which need to be re-executed, nor of the existence of an exception associated with a boosted instruction. Furthermore, re-executing all boosted instructions, regardless of which one caused the exception, is clearly inefficient. For example, consider the case where a large number of instructions are boosted, and the exception occurs in the last boosted instruction. The mechanism of M. D. Smith et al. would re-execute them all, even though it would have been sufficient to re-execute a single instruction.

A second solution suggests a software mechanism for handling a limited number of special cases of speculative instructions, namely only speculative LOAD instructions of "global" addresses (identified by their use of a base register which points to a known "global" table), "similar" addresses (same base register and similar displacement to a "close" non-speculative load), and "NIL pointer" addresses (which can be proven to contain the value zero, this addressing the first page in memory). See, D. Bernstein, M. Rodeh and M. Sagiv, "Proving Safety of Speculative Load Instructions at Compile Time," in *Lecture Notes in Computer Science*, Vol. 582, B. Krieg-Brueckner(Ed.), *Proc.* 4th *European Symposium on Programming*, Rennes, France, February 1992, Springer-Verlag. The proposed mechanism of Bernstein et al. relies on these special cases to create speculative loads by analysis of either object or source code, with support from a Linker and the Operating System to avoid exceptions on those cases where the speculative instructions are not in the taken path.

Three problems are not addressed in this approach, namely the possibility that a speculative instruction in the taken path causes an exception, the (dangerous) masking of an exception which would occur in the sequential program, because of the changes introduced in the Linker, and the possibility of introducing an exception which would not occur in the original program. In all three cases the behavior of the program with the speculative instructions, as seen by the programmer, is different from that of the original (sequential) code.

To illustrate the three cases, consider the following sequence of instructions:

| #1 | LOAD | R3,0(R5) |
| #2 | LOAD | R4,8(R5) |
| #3 | COMPARE | R4,0 |
| #4 | BEQ | OUT |
| #5 | COMPARE | R3,1000 |
| #6 | BEQ | OUT |
| #7 | LOAD | R5,16(R4) |
| OUT: | | |

According to the approach of Bernstein et al., instruction #7 can be safely moved above instruction #3, and made into a speculative load. In the first case, and assuming a bug in the program, such as the programmer specifying a displacement of 8 instead of 4 in instruction #2, the address formed by adding 16 to the (non-zero) contents of R4 will result in pointing to an invalid address. Executing instruction #7 would cause an exception, whether it is moved or not, but its movement would result in an imprecise exception (the state of the machine would be different in both cases).

More serious is the second case, where an exception present in the sequential code, representing a bug in the program, is masked by the addition of dummy extra pages at data segment boundaries (as suggested by Bernstein et al.) to protect from boundary crossings by "similar" loads. In the code segment above, assume that R3 is loaded with some value different from 1000 (say 2000) by instruction #1. Furthermore, assume that the effective address for instruction #7 is outside of the program's data segment (say the displacement should have been 0 instead of 16). Because of the dummy page inserted by the Linker, the load instruction will not cause an exception (regardless of whether it is moved or not) possibly leading to erroneous results the cause of which would not be readily apparent to the programmer.

The third case deals with the introduction of an exception, caused by the speculative load, which would not be present in the original code. To illustrate this case, assume now that R3 is loaded with the value 1000 by instruction #1. Also, assume that the address formed by adding 16 to the (non-zero) contents of R4 is an invalid address. Since the comparison in instruction #5 yields an "equal" result, the branch of instruction #6 is taken. Thus, instruction #7 would not be executed in the original code. But, if it is moved above instruction #3, not only will it be executed, but it will also cause an exception.

DISCLOSURE OF THE INVENTION

Objects of the invention include a minimization of CPU overhead from exceptions from speculative instructions, as well as efficient handling of an exception for a speculative instruction which turns out to be in the taken path. In accordance with the teaching of this invention, an exception from a speculative instruction is processed if and only if it would occur in the original sequential program.

The invention disclosed herein includes hardware mechanisms to handle exceptions caused by speculative instructions. Speculative instructions have an extra bit, referred to as a speculative bit, which is set. A speculative instruction is an instruction moved above a conditional jump which determines whether or not the speculative instruction is in the taken path. Non-speculative instructions have the speculative bit reset.

The invention is described within the context of a VLIW (Very Large Instruction Word) processor architecture, but a similar approach can be used with superscalar and/or pipelined architectures as well. In the context of VLIW, a single instruction contains a number of instructions, all of which are issued at the same time, and some of which may be speculative. Thus, speculative operations become speculative instructions, but the principles remain the same. Therefore, we shall use the term speculative instruction in the interest of generality. This mechanism is supported by a parallelizing compiler which tracks register usage by speculative instructions to enable their re-execution when they are affected by an exception. The technique of this invention significantly reduces the overhead from exceptions caused by speculative instructions.

According to the present invention, CPU overhead is minimized through: a) tracking speculative exceptions, for later processing during resolution, including pointing to the addresses of these speculative instructions; and b) resolving these exceptions by correcting the cause of the exception and re-executing the instruction(s) which are known to be in the taken path. Tracking speculative exceptions has two components which use an exception bit.

A first component is the tracking of an original speculative exception which occurs when a speculative instruction, whose operands do not have any exception bits set, encounters an exception condition. Briefly, this tracking includes: (i) setting a target register in a register file to point to the address of the speculative instruction; (ii) setting an exception bit in an exception bit file; (iii) storing in an extra register the operand(s) of the speculative instruction; and (iv) storing in an extra exception bit file the exception bit.

The second component is employed where a speculative instruction attempts to use a register having its exception bit set as above. In this case, a secondary speculative exception is created, and exception tracking includes: (i) setting a target register to point at the speculative instruction address as above; (ii) setting the exception bit of the target register; and (iii) setting the contents of the extra register to the register number of the operand in the speculative instruction rather than the register's contents (and setting the exception bit of the extra exception file). This allows tracing back to the speculative instruction causing the original speculative exception for its resolution. Exception tracking also discards information for speculative exceptions which turn out to be outside the taken path. Speculative exception resolution is triggered when a non-speculative instruction, which is in the taken path, uses an operand from a register having its exception bit set. Speculative exception resolution includes correcting the exception condition which caused the exception and re-executing the instructions which depended on the results of the instructions causing the speculative exception.

The advantage to this approach is that rather than re-executing all speculative instructions, as does the prior art, only those which depend a) on the instruction causing exception, and b) are in the taken path, are re-executed. This approach saves CPU processing time.

More objects, features and advantages will become apparent in light of the text below and the drawings.

BEST MODE FOR CARRYING OUT THE INVENTION

VLIW Architecture and Invention Overview

Figure 1A:
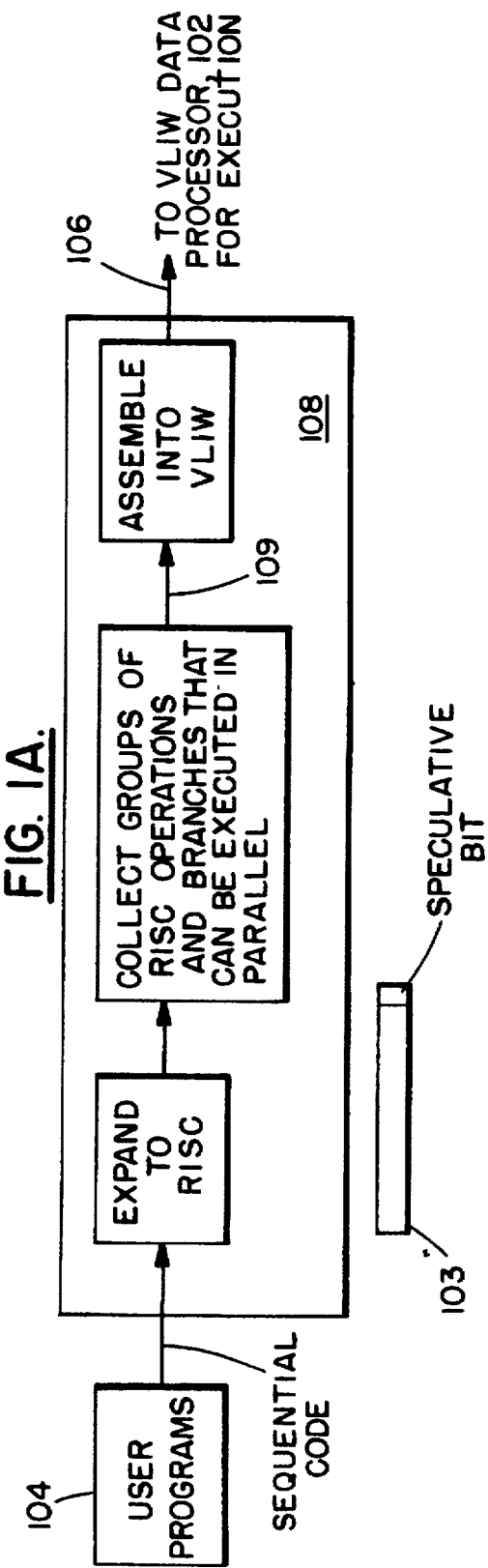
FIG. 1a is a block diagram of a VLIW compiler having an output for providing VLIWs to a VLIW data processor.
Figure 1B:
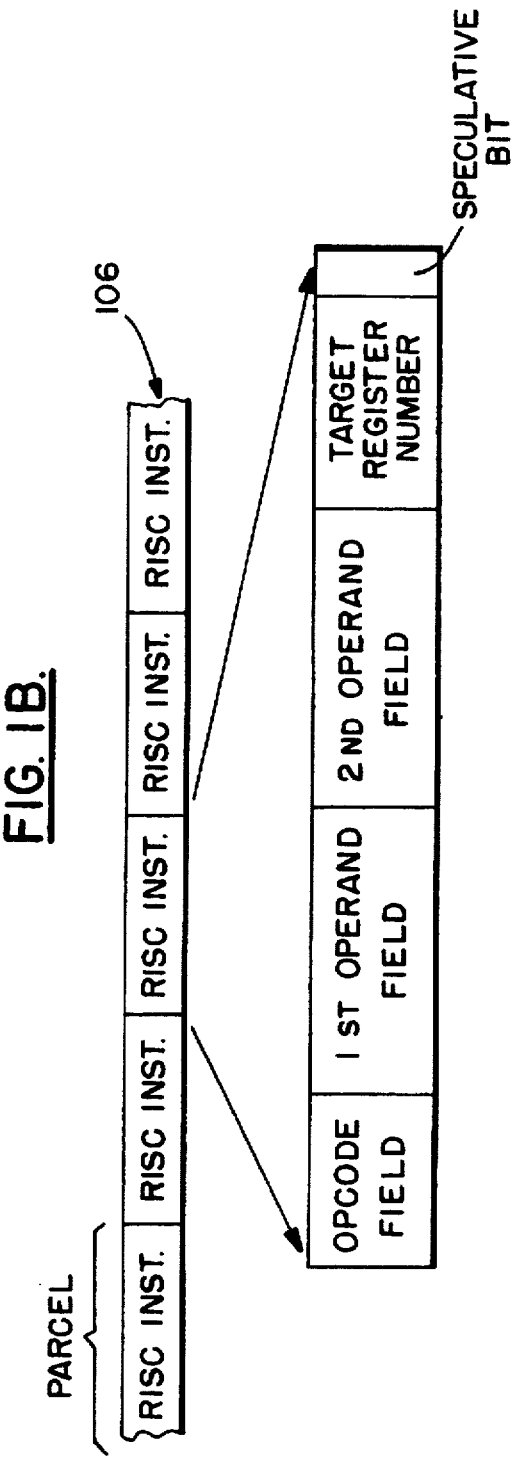
FIG. 1b illustrates a portion of a line of VLIW code.

Referring first to FIGS. 1a and 1b, a Very Long Instruction Word (VLIW) compiler 108 operates to compile user programs 104 directly into a VLIW 106 which is embodied as a highly parallel, horizontal microcode as its name suggests (perhaps 500–2000 bits in length). As is shown in FIG. 1b, the VLIW 106 is comprised of a number of Reduced Instruction Set, or RISC, instructions, also referred to herein as parcels, each controlling a different resource (e.g. arithmetic logic unit (ALU), branch unit) in a VLIW data processor or machine 102. Thus, within a single cycle, the VLIW machine 102 can execute the equivalent of many RISC instructions.

Each RISC instruction can include an opcode field, a first operand field, a second operand field, and a target register number field. An additional one bit field, referred to herein as a speculative bit field, or more simply as a speculative bit, is provided to distinguish speculative RISC instructions from non-speculative RISC instructions, as is described in greater detail below.

In operation, the parallelizing compiler 108 takes conventional sequential assembly code (or intermediate code from a high level language compiler) as input, expands any complex instructions to simpler RISC instructions, if necessary, to provide a RISC version of the sequential code, and using advanced compilation techniques (for example, one suitable compilation technique is described T. Nakatani and K. Ebcioglu, "Using a Lookahead Window in a Compaction Based Parallelizing Compiler," Proc. 23rd Workshop on Microprogramming and Microarchitecture, IEEE Computer Society Press, November 1990, pp. 57–68) determines groups 109 of RISC instructions and branches that can be executed simultaneously (these can be far apart in the code). The parallelizing compiler 108 then places each such group 109 in the VLIW 106 which the VLIW machine 102 can execute in a single cycle. As a result the user program 104 executes faster without requiring a change to the source code, through the recompilation process carried out in the parallelizing compiler 108.

It should be noted that the VLIW compiler 108 can be a part of the VLIW machine 102, or can be a separate data processor. The specifics of the structure and operation of the VLIW compiler 108 do not form a part of this invention, and are thus not described in any greater detail.

For the purpose of handling exceptions due to speculative instructions, the VLIW machine 102 has registers, shown generally in FIG. 1a as the register 103, with an extra bit (the 33rd bit, assuming the registers 103 are normally 32 bits long). Reference in this regard can be made to K. Ebcioglu, "Some Design Ideas for a VLIW Architecture for Sequential-Natured Software," Proc. IFIPWG10.3 Working Conf. on Parallel Processing, N. Holland, 1988, pp. 3–21).

Thus, in FIG. 1b each RISC instruction used in the parcels of a VLIW instruction 106 has a speculative and a non-speculative version; that is, the extra bit (speculative bit) in the parcel indicates if this RISC instruction is speculative or is not speculative.

If the RISC instruction has the speculative bit on, this instruction is executed in the VLIW 102, before knowing the result of a conditional jump in the VLIW 106 that determines whether this instruction will be executed or not in the original sequential code. Also, when an exception bit of a register 103 is set, a speculative instruction has caused an error (e.g., an overflow, a load from an invalid address).

HANDLING SPECULATIVE EXCEPTIONS

Figure 2:
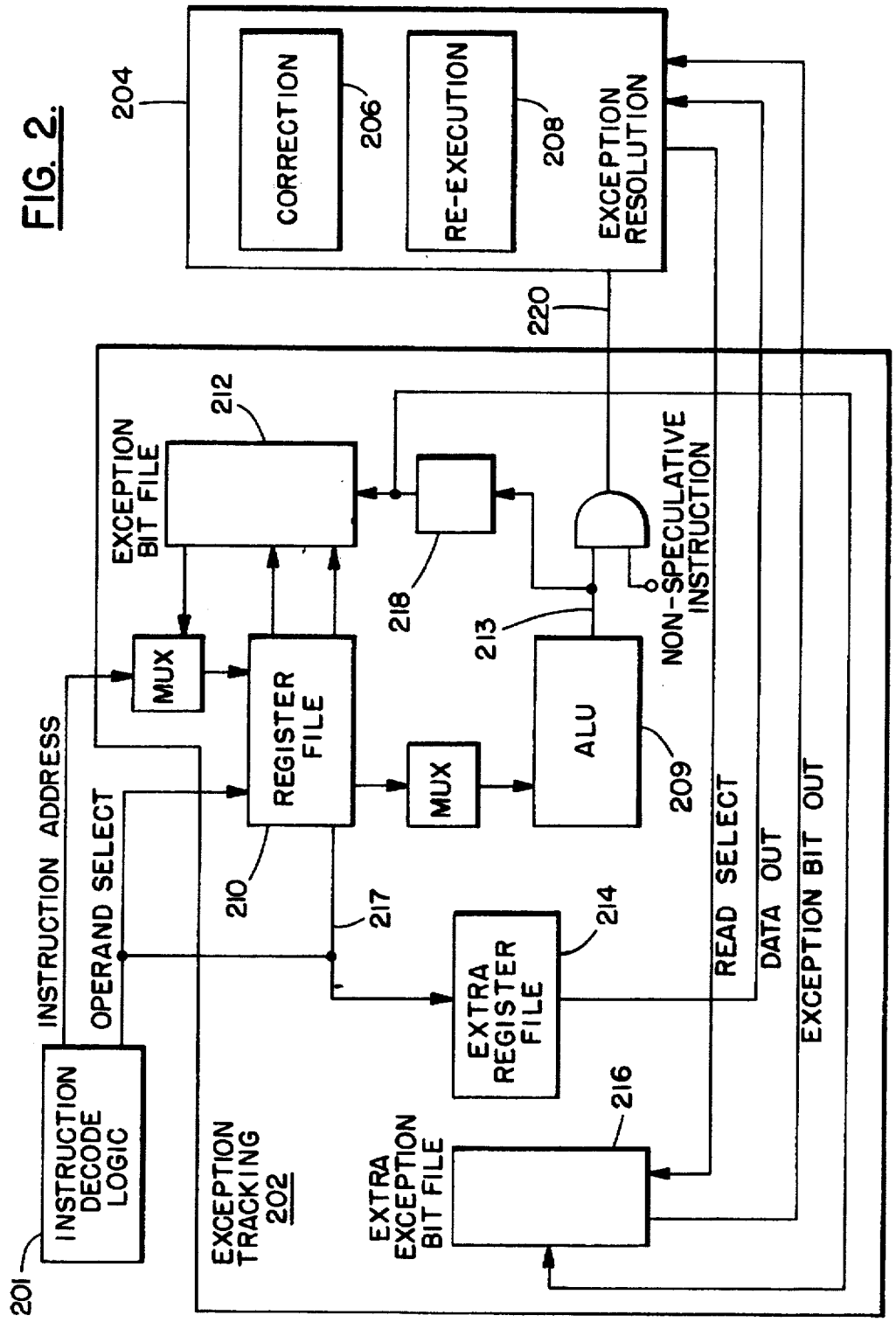
FIG. 2 is a block diagram of the speculative instruction handling mechanism of this invention.

FIG. 2 is a block diagram of a data processing system in accordance with this invention. CPU overhead is minimized through (a) tracking speculative exceptions 202, for later processing during exception resolution 204, including pointing to the addresses of these speculative instructions; and (b) resolving these exceptions by correcting 206 what caused the exception and re-executing 208 the instructions which are known to be in the taken path.

Tracking speculative exceptions has two component parts which use the exception bit which is set in response to an exception condition 213. An exception condition may be generated in a number of ways, including exception conditions arising from the operation of an arithmetic logic unit (ALU) 209.

First, is the tracking of an original speculative exception which occurs when a speculative instruction, whose operands do not have any exception bits set, encounters an exception condition. Briefly, this tracking includes: (i) setting a target register in a register file 210 to point to the address of the speculative instruction given by an instruction address provided through a multiplexer (MUX), (ii) setting an exception bit in an exception bit file 212 associated with the target register in response to an exception condition 213 from the ALU 209; (iii) storing in an extra register in an extra register file 214 the operand(s) of the speculative instruction and storing in an extra exception bit file 216 the exception bit (which is not set for original speculative exceptions but is set for secondary speculative exceptions, i.e., which use results of speculative instructions that cause speculative exceptions). An operand select line 217 from instruction decoding logic 201 provides signals to both the register file 210 and extra register file 214. Logic in a block 218 provides the distinction between original and secondary speculative exceptions.

Second, where a speculative instruction attempts to use a register having its exception bit set, as in the original speculative exception above, a secondary speculative exception is created, and exception tracking includes: (i) setting a target register in the register file 210 to point at the speculative instruction address as above; (ii) setting the exception bit of the extra register 212 in response to the exception condition 213; and (iii) setting the contents of the extra register of the extra register file 214 to the register number(s) of the operand(s) in the speculative instruction rather than the register's contents by the register select line 217 (and setting the exception bit of the extra exception bit file 216) to allow tracing back to the speculative instruction causing the original speculative exception for its resolution 204.

Speculative exception resolution is triggered when a non-speculative instruction, which is in the taken path, uses an operand from a register having its exception bit set. The presence of an exception condition and a non-speculative instruction generates an exception signal 220 to exception resolution block 204. Speculative exception resolution 204 includes responding to output signals from the extra register and extra exception bit for correcting 204 the exception condition which caused the exception and re-executing 208 the instructions which depended on the results of the instructions causing the speculative exception.

Compiler Support

Figure 3:
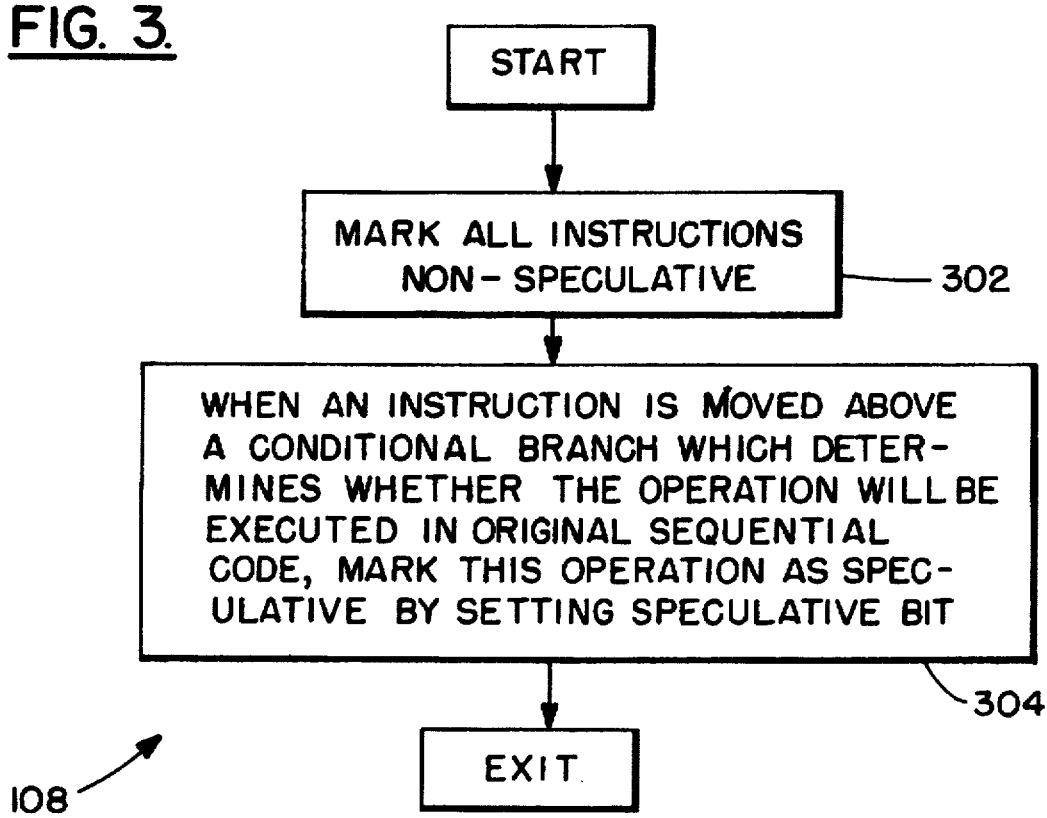
FIG. 3 is a flowchart illustrating a technique for marking speculative instructions.

In FIG. 3, parallelizing compiler 108 can make use of the speculative/non-speculative bits as follows. First, all instructions in the user program 104 (FIG. 1) are marked non-speculative 302. During parallelization, when an instruction is moved above a conditional jump which determines whether this instruction is executed in the original code, it is marked speculative by the compiler 304. (If an instruction is not definitely executed on both paths of a conditional branch, then this conditional branch determines in the sequential code whether the instruction will be executed.) This is all that is needed to utilize the exception bit mechanism in the simplest possible way.

If it is desired that all exceptions that occur in the original program be detected in the parallel program, the parallelizing compiler 108 (FIG. 1) must ensure that the result of each speculative instruction is eventually used directly or indirectly by a non-speculative instruction, by introducing new non-speculative instructions if necessary (typically this may not always be necessary, since stores and conditional branches are not speculative).

The invention described herein also solves the problem of processing unneeded interrupts. In accordance with the teaching of this invention, an exception is processed in the VLIW 106 if and only if it would occur in the original sequential program.

The Speculative Exception Hardware Mechanism—Tracking

As explained in the previous section, a speculative exception is associated with a register which received a result (the so called target) of an instruction causing the exception. In this context, the word "register" encompasses more than the usual "general purpose" registers. It means any register with the exception bit set. Therefore, recording of the exception occurrence can be associated with that register if the compiler guarantees that the same register cannot be the target for more than one speculative instruction at a time. This means that the register cannot be reused before its result is consumed by a non-speculative instruction, or it is not needed because it is outside the taken path.

It is assumed that the register size is 32 bits, with the extra bit (33rd bit) serving as a flag for speculative exceptions. The extension to larger (or smaller) register sizes is within the scope of the invention, with the n+1 bit serving the role of the exception bit, for a register of n bits.

In this invention a speculative exception is associated with its target register by saving the address of the instruction causing the exception in the target register, and setting its exception bit. An alternative would be to save the instruction itself, possibly after decoding. This would require extra storage to hold the instruction, but would speed up its execution if it turns out to be in the taken path. Also, this may avoid cache misses, since the line containing the instruction does not have to be accessed a second time.

The remainder of the speculative instruction processing includes two components: a) exception tracking which is fully implemented in hardware, and b) exception resolution which is mostly software controlled.

Exception tracking deals with speculative exceptions as they occur, and distinguishes between two cases. The first case concerning an original speculative exception, while the second case concerns the condition where a speculative instruction attempts to use as an operand a value which has the exception bit set, which is referred to herein as a secondary speculative exception. Exception tracking is also responsible for discarding information associated with a speculative exception which has been found to be outside of the taken path.

The exception resolution component is triggered when a non-speculative instruction uses as an operand a register with the exception bit set. We say that at this point the speculative exception(s) which set that exception bit have materialized. Exception materialization and resolution are the subject of the next section, as it deals mostly with software support. The remainder of this section deals with the hardware support for exception tracking.

1) Original speculative exception tracking

This section concerns a speculative instruction which causes a regular exception i.e., one which is not caused by an attempt to use a register value which has the exception bit set. If any instruction operands are contained in the register file 210 their values are copied into the corresponding extra register of the extra register file 214 with the exception bit reset. If an extra register is not used (the corresponding operand is not in a register or the instruction does not require it), its exception bit is reset and its value is left undefined. Copying of values of the register file 210 is performed directly from the register file 210 over an additional data path from the register file ports to the extra registers file 214.

Figure 4:
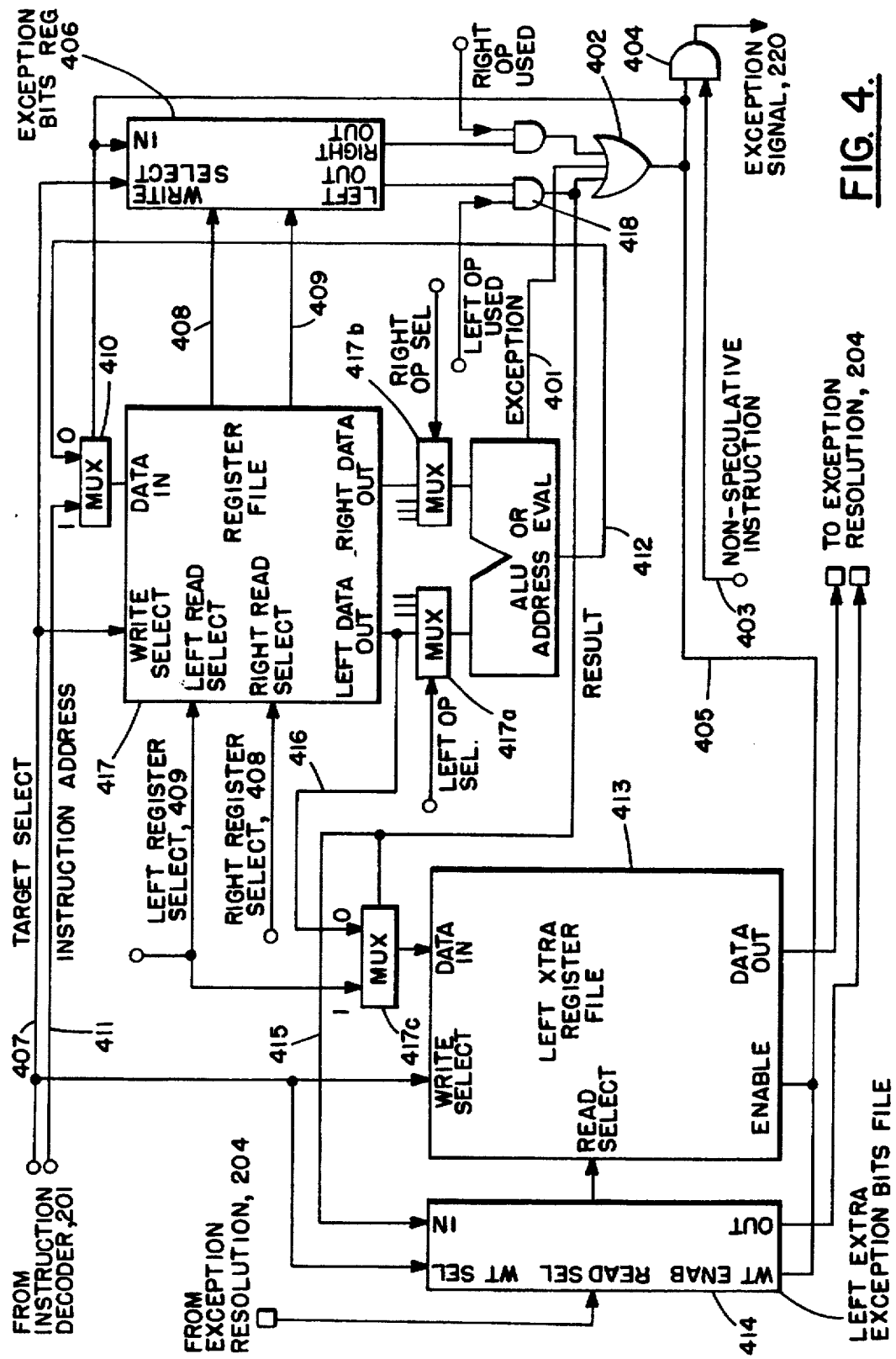
FIG. 4 is a block diagram of hardware used for speculative exception tracking in accordance with this invention.

Referring to FIG. 4 the original speculative exception is described in more detail (darkened circles are inputs from the instruction decoder 201 and darkened squares are inputs/outputs from the exception resolution 204 of FIG. 2). This type of exception occurs when a speculative instruction, whose operands do not have any of their exception bits set, encounters an exception condition, such as overflow, page fault, etc. When this happens, the exception line 401 is set, which causes the output of OR gate 402 to become true. Since the instruction causing the exception is speculative, the lower input 403 to AND gate 404 is false, and thus there is no Exception signal 220 output from AND gate 404. This means that no direct processing of the exception occurs at this time.

To keep track of the exception for later processing, if needed, line 405 conveys the exception signal into the "in" port of the Exception bits register 406, while the "write select" port of 406 and 417 selects the bit corresponding to the target register for the speculative instruction causing the exception, as determined by the target select line 407. At the same time, line 405 controls the MUX 410 which selects its left input-the instruction address line 411-rather than the Result line 412. This causes the instruction address 411 to be stored in the target register file 417, thus, serving as a pointer to the exception-causing instruction for use during exception resolution.

Notice that the "right out" and "left out" ports from exception bits register 406 (a two-read, one-write file of width 1 bit) supply the exception bit for the right and left operands for the instruction, as selected by the right register select line 408 and left register select line 409, respectively. Since it is assumed that the operands do not have their exception bits set, these outputs are both false, and thus line 415 is false. By a file being designated as "two-read, one-write" it is implied that the file is capable of simultaneously outputting data through two read ports while also inputting data through one write port.

Line 405 also serves as a write-enable signal for the left extra register file 413 and left exception bits file 414. Line 405 does the same for the equivalent "right" register files (not shown). This assumes at most two operands per instruction, while the generalization to more operands is straightforward. The "write select" ports of both files receive their input from target select line 407, serving as an extension to the information stored in the target register in register file 417 for the instruction causing the speculative exception. The left extra register file 413 (a 1-read, 1-write file) of width determined by the length of the operands in the given architecture (for example, 32 bits), stores the left operand of the instruction, as selected by the MUX 417c controlled by line 415 (415 is false, as explained above), and produced by the "left data out" port of register file 417. Register file 417 is a 2-read/1-write file of width determined by the operands in the given architecture (for example, 32 bits). This output is selected by the left register select line 409. In parallel, the state of line 415 is stored in the left exception bits file 414 (a 1-read, 1-write file of width 1 bit).

Some operands are not an integral part of a speculative instruction which causes an exception. The function of extra register files 413 is to store enough information about operands which are not an integral part of a speculative instruction which causes an exception, so that the instruction can be re-executed if it is found to be in the taken path. In other words, operands which are part of the instruction—literals contained in the instruction can be extracted from the instruction to be re-executed during exception resolution (discussed below). Other inputs feed the MUXes 417a and 417b at the bottom of the register file 417. These inputs possibly come from literal (immediate) fields in the instruction. Thus, an instruction may have two operands, but only one of them (or possibly none) come from register(s). The other may be taken from some field in the instruction under control of the instruction decoder, through the left and right operand select lines. Other possible sources of operands include special purpose registers in the data processor, which are separate from the register file.

2) Secondary Speculative Exceptions

When a speculative instruction attempts to use as an operand a register in the register file 417 which has the corresponding exception bit in 406 set, a "secondary speculative exception" is created thus. In the following discussion, it is assumed that the left operand (at least) has its exception bit set. The exception bit corresponding to the left operand in the speculative instruction is selected in the exception bits file 406 by the left register select line 409. This exception bit appears at the "left out" port of exception bit file 406 and feeds AND gate 418, which is also controlled by the signal named left operand used 419 which is true when the instruction actually uses a left operand in a register in register file 417. It is noted that in architectures that support instructions with two operands, some instructions may have one or no operands. The output of AND gate 418, which is assumed true in this case, feeds OR gate 402 which produces a true value on line 405, thus signaling a speculative exception.

The saving of the instruction address in the target register in file 417, and the marking of its exception bit in exception bit file 406 both proceed as in the case of an original exception. But, in this case, the contents of files 413, 414 are different from what they were for the original speculative exception. The left extra register file 413 receives, instead of the left operand itself, the number of the register that was intended to hold the operand. Since it is assumed that the compiler guarantees at most one speculative exception per target register, specifying the register number allows the trace back to the instruction causing the original speculative exception, in case resolution is required. The register number is determined by the left register select line 409, and fed through MUX 417c, as controlled by line 415 (which has a true value). Line 415 also serves to set the exception bit in the left exception bits file 414. Recording a register number, rather than its contents, requires the multiplexer 417c at the input port of each of the two extra register files. Multiplexer 417c is fed from the target register file(for contents) and the instruction decoding logic (for register number).

Clearly, the instruction address can be latched and preserved, including its position within the VLIW instruction 106 (FIG. 1), so that it can be copied into the register file 417 when a speculative exception occurs. Upon completion of this process, execution of the VLIW 106 resumes as usual.

(3) Discarding Speculative Exceptions

Speculative instructions which turn out to be outside the taken path may leave the register file 417 with the exception bit 406 set, as a result of an exception during their execution. Therefore, each time a result is stored into a register, either by a non-speculative instruction or by a speculative instruction which does not cause an exception, the exception bit for that register is reset. By keeping track of live registers, the parallelizing compiler 108 (FIG. 1) guarantees that speculative and non-speculative values are not commingled, so that extraneous exceptions do not occur in the user program 104 (FIG. 1).

It is noted the following problem may exist with this technique. By example, the original (sequential) program may use a register not initialized (because of a bug). It is possible that a speculative instruction set that register, and thus it either contains a value, or has its exception bit set because of a speculative exception. In either case, the behavior of the program would not be consistent with the original version. To protect against this, checks for initialization or an explicit resetting of (at least the speculative bit of) a register which contains a speculative value can be inserted at the end of the program segment for which the register is being kept live (see next section).

EXAMPLE

Consider the (mostly speculative) instruction sequence shown in Table 1. For simplicity instructions are listed individually (one per line), but in a VLIW environment they would be grouped several per VLIW instruction.

TABLE 1

| | | | |
|---|---|---|---|
| 100 | LOAD | R4,0(R5) | S |
| 101 | LOAD | R6,0(R3) | S |
| 102 | LOAD | R1,8(R4) | S |
| 103 | LOAD | R2,12(R6) | S |
| 104 | ADD | R1,R2,R7 | S |
| 105 | MULT | R1,R8,R9 | S |
| 106 | ADD | R9,R9,R10 | S |
| 200 | STORE | R7,8(R11) | N |

Table 1 includes a sample sequence of instructions. Each instruction is flagged by "S" for speculative, or "N" for non-speculative (this would be represented by a value for the speculative bit in the instruction). LOAD uses the address in the right operand to access memory and load the contents into the left (target) register. (STORE performs the opposite function.) ADD/MULT uses the first and second (left and right) operands as input, with the results stored in the third (target) register.

Assume that registers R5 and R3 contain addresses of pages which are not resident in memory, say 2000 and 30000, and their use in instructions 100 and 101 will each cause a page fault exception. The other relevant registers are R8 and R11, which are assumed to have their exception bits reset (they were not the target of a speculative instruction which caused an exception), and contain 234 and 10000, respectively (assume the page containing address 10000 is resident in memory). When execution reaches instruction 200, a non-speculative instruction, the speculative exceptions materialize. Before the exceptions are resolved, the contents of the relevant registers are listed in Table 2. Each line shows the contents of the "regular" register 417, as well as the corresponding ("left" and "right") extra registers 413, together with the exception bit 406 and 414 for each. The I-nnn entry symbolizes the address of instruction nnn in the sequence.

TABLE 2

| Register | Regular + f | Extra_Left + f | Extra_Right + f | Comments |
|---|---|---|---|---|
| R1 | I-102 + 1 | ??? + 0 | 4 + 1 | Right op points to R4 |
| R2 | I-103 + 1 | ??? + 0 | 6 + 1 | Right op |

TABLE 2-continued

| Register | Regular + f | Extra_Left + f | Extra_Right + f | Comments |
|---|---|---|---|---|
| R3 | 30000 + 0 | ??? + 0 | ??? + 0 | points to R6 Given |
| R4 | I-100 + 1 | ??? + 0 | 2000 + 0 | Right op is (R5) |
| R5 | 2000 + 0 | ??? + 0 | ??? + 0 | Given |
| R6 | I-101 + 1 | ??? + 0 | 30000 + 0 | Right op is (R3) |
| R7 | I-104 + 1 | 1 + 1 | 2 + 1 | Both ops |

Resolving the causes of the exception means having the system take some action to possibly correct whatever caused the speculative exception. For example, if the exception was a page fault, caused by addressing a datum not currently resident in memory, resolving the cause would involve bringing into memory the page which contains the datum, updating tables, etc. The second component, re-execution, would involve repeating the execution of instructions, now known to be in the taken path, which somehow used the result of the operation causing the exception.

TABLE 3

```
resolve_exception: FUNCTION (register_index) RECURSIVE RETURNS (register_value)
    /* Exception may have been resolved already. If so skip   */
    /* processing and return the contents of R[register_index]  */
    IF   f(R[register_index])         THEN
        /* Check if left operand needs resolution. If so recur.  */
        IF   f(XL[register_index])    THEN
            c(XL[register_index]) = resolve_exception (c(XL[register_index]))
            f(XL[register_index]) = 0
        /* Check if right operand needs resolution. If so recur.  */
        IF   f(XR[register_index])    THEN
            c(XR[register_index]) = resolve_exception (c(XR[register_index]))
            f(XR[register_index]) = 0
        /* Operands ready, EXECUTE instruction and set the contents      */
        /* of R[register_index], while resetting its 33rd bit flag.      */
        /* Any exceptions during instruction execution are handled       */
        /* on the fly, as if they came from regular (non speculative)    */
        /* instruction execution.
        EXECUTE  (c(R[register_index]),   /* instruction pointer        */
                  c(XL[register_index]),  /* left operand register      */
                  c(XR[register_index]))  /* right operand register     */
    /* f(R[register_index]) = 0 is implicit                              */
    /* At this point the register has the correct contents.              */
    RETURN (c(R[register_index]))
END resolve_exception.
```

TABLE 2-continued

| Register | Regular + f | Extra_Left + f | Extra_Right + f | Comments |
|---|---|---|---|---|
| | | | | indicate exceptions (R1 & R2) |
| R8 | 234 + 0 | ??? + 0 | ??? + 0 | Given |
| R9 | I-105 + 1 | 1 + 1 | 234 + 0 | Left op points to R1, right op is (R8) |
| R10 | I-106 + 1 | 9 + 1 | 9 + 1 | Both ops point to R9 |
| R11 | 10000 + 0 | ??? + 0 | ??? + 0 | Given |

Table 2 shows regular and extra register contents and flags. The three middle columns correspond to locations in files 417/406, 413/414, and the equivalent of 413/414 for the right operand. State reflects speculative exceptions for (regular) registers R1, R2, R4, R6, R7, R9 and R10. Execution of instruction 200 will materialize the exception on R7, and indirectly those on R1, R2, R4, and R6.

Speculative Exception Materialization and Resolution

When a non-speculative instruction encounters an operand (register) with its exception bit set, it is said that the speculative exception(s) which set that exception bit have materialized. Control is passed to a speculative exception resolution mechanism shown in Table 3, which attempts to a) resolve the causes(s) of the exception and b) re-execute any speculative instructions which depended on the exception and have now been determined to be in the taken path.

Table 3 shows an outline of a recursive function to implement exception resolution. Assume that R[i] is the register which caused the exception to materialize. Recall that the contents of R[i] point to the (speculative) instruction which should be re-executed to resolve the exception, and that the extra register XL[i] (left) and XR[i] (right) corresponding to R[i] may contain the operands required to perform the instruction. The notation c(r) and f(r) is used for the contents and exception bit of register r, respectively, where r is a regular (R), extra left (XL), or extra right (XR) register. Thus, the resolve_exception function is called once for each operand register in a non-speculative instruction, which has its speculative bit set.

EXAMPLE

Consider again the instruction sequence shown in Table 1 and the register contents given in Table 2 and consider Table 4. Executing instruction 200 would cause the sequence of calls given in Table 4 (indentation reflects the level of recursion), with vvv, www, xxx and yyy representing the values assigned to R4 (by I-100), R1 (by I-102), R6 (by I-101) and R2 (by I-103), respectively.

TABLE 4

```
Left_Op = resolve_exception (7)
    c(XL[7]) = resolve_exception (1)
    c(XR[1]) = resolve_exception (4)
        EXECUTE (I-100, ???, 2000)      /* f(R[4]) = 0 is implicit */
    EXECUTE (I-102, ???, vvv)           /* F(R[1]) = 0 is implicit */
```

TABLE 4-continued

```
c(XR|7|) = resolve_exception (2)
c(XR|2|) = resolve_exception (6)
    EXECUTE (I-101, ???, 30000)    /* f(R|6|) = 0 is implicit */
    EXECUTE (I-103, ???, xxx)      /* f(R|2|) = 0 is implicit */
    EXECUTE (I-104, www, yyy)      /* f(R|7|) = is implicit */
```

Now, if some non-speculative instruction uses R10 as its right operand after instruction 200 has completed, the sequence of calls would be as shown in Table 5 (with zzz representing the value assigned to R9 by instruction I-105).

TABLE 5

```
Right_Op = resolve_exception (10)
c(XL[10]) = resolve_exception (9)
    c(XL|9|) = resolve_exception (1)   /* since f(R[1]) = 0 its contents are returned */
    EXECUTE (I-105, www, 234)          /* f(R|9|) = 0 is implicit */
c(XR|10|) = resolve_exception (9)      /* since f(R|9|) = 0 its contents are returned */
    EXECUTE (i-106, zzz, zzz)          /* f(R|10|) = 0 is implicit */
```

Clearly, the hardware is required to support access to read and write the contents of the extra registers and their flags (partially shown in FIG. 4), as well to (implicitly) reset the exception bit of a register 417, either by the speculative exception resolution mechanism 204, or by a non-speculative instruction writing in the register 417.

If a fatal exception occurs while a speculative exception is being resolved, some registers may not be consistent with their state in a sequentially executed version of the same program. For example, consider a fatal exception while attempting to re-execute instruction 102 while resolving the speculative exception of R7, as shown above. In this case, instruction 100 (which sets R4) has been completed, but instruction 101 (which sets R6) remains to be resolved. Thus, the contents of R6 are not consistent with the fact that 102 is the instruction causing the fatal exception. Nevertheless, since the exception bit of R6 is still set, it can be identified as containing the address of an instruction with a pending speculative exception. Furthermore, a list of all such instructions can be provided as part of the data associated with a fatal exception (for diagnosis purposes), by simply listing the contents of all registers which have their exception bit set.

Compiler Support

As already mentioned in previous sections, the parallelizing compiler 108 (or whatever program is used to create speculative instructions) must keep track of the registers 413 or 417 used by speculative instructions, so that at no point in the program more than one such instruction has the same register 413 or 417 as the target for its result. In other words, a register 413 or 417 set by a speculative instruction should not be reused before either its value is consumed by a non-speculative instruction, or it is determined that this value is not needed, since the speculative instruction turned out to be outside the taken path. The first case, where a non-speculative instruction uses as an operand the contents of a register 413 or 417 set by a speculative instruction, forces the compiler 108 to keep that register 413 or 417 "live," thus blocking its setting by other instructions.

To cover the second case, the parallelizing compiler 108 introduces a dummy instruction at the end of the speculative path, which uses as operands all registers 413 or 417 which are set by speculative instructions, and are not used as operands by non-speculative instructions. The reason these registers 413, 417 are kept "live" up to the point in which it can be determined whether they are outside the taken path, is because they serve as operands for speculative instructions, and as such they may contain a speculative exception that may need to be resolved when it is determined that they are part of the taken path.

Using the above approach, it is possible that because a register 413, 417 is not initialized in the original program, a register 413, 417 set by a speculative instruction may be subsequently used by a non-speculative instruction, before it is properly initialized. This can cause an extraneous exception (if the register 413, 417 had its exception bit set), which is actually the result of a failure to initialize the register 413, 417. To avoid this situation, an instruction which resets the speculative bit of a register 413, 417 (and optionally sets its value to "undefined") can be used instead of the dummy instruction that keeps 'live' the registers 413, 417 set by speculative instructions.

Also to be considered is the relation of speculative exceptions to the enabling/disabling of exceptions for a particular task or task segment. A simple approach would ignore the question of whether the particular exception is enabled or disabled, until the exception materializes. At that point, a check is made to see what the processing should be, as if the exception was caused by a non-speculative instruction. In most cases, the compiler can keep track of exception enabling and disabling instructions, so that the resulting behavior is consistent with the sequential program. In those cases where this may not be possible, the compiler 108 would avoid the creation of speculative instructions for the sequence of instructions. In summary, speculative exceptions are recorded, regardless of whether they are disabled. Only at resolution time are speculative exceptions checked against enabled exceptions. The parallelizing compiler assures that no exception is taken when it should be disabled.

While the invention has been particularly shown and described with respect to preferred embodiments thereof, it will be understood by those skilled in the art that changes in form and details may be made therein without departing from the scope and spirit of the invention.

We claim:

1. A method for handling speculative exceptions while parallel processing sequential code, comprising the steps:
   speculatively executing one or more instructions;
   tracking a speculative exception caused by a speculative instruction; and
   subsequently resolving the speculative exception by correcting for the exception condition and re-executing only the speculative instruction and any speculative instructions that are dependent on the speculative instruction.

2. The method of claim 1, wherein the step of tracking includes tracking both original speculative exceptions and also secondary speculative exceptions which occur when a speculative instruction attempts to use as an operand a value having an associated exception bit set.

3. The method of claim 1, wherein the step of tracking speculative exceptions includes the steps of:
  a) tracking original speculative exceptions including
    i. setting an exception bit in an exception bit file associated with a first target register in a register file in response to said exception condition;
    ii. setting the first target register to point at the address of the speculative instruction; and
    iii. storing in an extra register in an extra register file at least one operand, if any, of the speculative instruction and storing in an extra exception bit set by the exception bit;
  b) tracking secondary speculative exception(s) when a speculative instruction attempts to use a register having its exception bit set by the steps of:
    i. setting an exception bit in an exception bit file associated with a second target register in a register file in response to said exception condition;
    ii. setting the second target register to point at the address of the speculative instruction; and
    iii. setting the contents of the extra register of the extra register file to the register number of the operand in the speculative instruction rather than the register's contents, and setting the exception bit of the extra exception bit file to allow tracing back to the speculative instruction causing the original speculative exception for its resolution.

4. The method of claim 1, wherein an initial condition for execution of the method includes marking all instructions non-speculative, but marking as speculative any instructions which are moved above a conditional branch which determines whether the instruction will be executed in a taken path of the sequential code.

5. A method for handling speculative exceptions while parallel processing sequential code, comprising the steps:
  tracking speculative exceptions including:
    in response to an occurrence of a speculative instruction which causes an exception condition;
    storing an address of the speculative instruction in response to the exception condition along with storing an exception bit;
    storing at least one operand, if any, of the speculative instruction in response to the exception condition, and storing associated exception bit(s);
    resolving speculative exceptions when a non-speculative instruction uses an operand having an associated exception bit set, such as a target register of said speculative instruction, by correcting for said exception condition and re-executing only the speculative instruction pointed at by its target register using the stored at least one operand and any speculative instructions that are dependent on said speculative instruction pointed at by its target register using the stored at least one operand.

6. The method of claim 5, wherein the step of tracking includes tracking both original speculative exceptions and also secondary speculative exceptions which occur when a speculative instruction attempts to use as an operand a value having an associated exception bit set.

7. The method of claim 5, wherein the step of tracking speculative exceptions includes the steps of:
  a) tracking original speculative exceptions including
    i. setting an exception bit in an exception bit file associated with a first target register in a register file in response to said exception condition;
    ii. setting the first target register to point at the address of the speculative instruction; and
    iii. storing in an extra register in an extra register file at least one operand, if any, of the speculative instruction and storing in an extra exception bit file the exception bit;
  b) tracking secondary speculative exception(s) when a speculative instruction attempts to use a register having its exception bit set by the steps of:
    i. setting an exception bit in an exception bit file associated with a second target register in a register file in response to said exception condition;
    ii. setting the second target register to point at the address of the speculative instruction; and
    iii. setting the contents of the extra register of the extra register file to the register number of the operand in the speculative instruction rather than the register's contents, and setting the exception bit of the extra exception bit file to allow tracing back to the speculative instruction causing the original speculative exception for its resolution.

8. The method of claim 5, wherein an initial condition for execution of the method includes marking all instructions non-speculative, but marking as speculative any instructions which are moved above a conditional branch which determines whether the instruction will be executed in a taken path of the sequential code.

9. An apparatus for handling speculative exceptions while parallel processing sequential code, comprising:
  means for providing one or more speculative instructions which cause an exception condition;
  means responsive to said exception condition for tracking a speculative exception caused by a speculative instruction; and
  means for resolving said speculative exception in response to a non-speculative instruction by correcting for said exception condition and re-executing only said speculative instruction and any speculative instructions that are dependent on said speculative instruction.

10. The apparatus of claim 9, wherein said means for tracking includes means for tracking original speculative exceptions and also secondary speculative exceptions which occur when a speculative instruction attempts to use as an operand a value having an associated exception bit set.

11. The apparatus of claim 9, wherein said means for tracking speculative exceptions includes
  a) means for tracking original speculative exceptions including
    i. means for setting an exception bit in an exception bit file associated with a first target register in a register file in response to said exception condition;
    ii. means for setting the first target register to point at the address of the speculative instruction; and
    iii. means for storing in an extra register in an extra register file at least one operand, if any, of the speculative instruction and storing in an extra exception bit file the exception bit; and
  b) means for tracking secondary speculative exception(s) when a speculative instruction attempts to use a register having its exception bit set, including
    i. means for setting an exception bit in an exception bit file associated with a second target register in a register file in response to said exception condition;
    ii. means for setting the second target register to point at the address of the speculative instruction; and
    iii. means for setting the contents of the extra register of the extra register file to the register number of the operand in the speculative instruction rather than the

17 register's contents, and setting the exception bit of the extra exception bit file to allow tracing back to the speculative instruction causing the original speculative exception for its resolution.

12. The apparatus of claim 9, wherein an initial condition for execution of the apparatus includes marking all instructions non-speculative, but marking as speculative instructions which are moved above a conditional branch which determines whether the instruction will be executed in a taken path of the sequential code.

13. An apparatus for handling speculative exceptions while parallel processing sequential code, comprising:

means for tracking speculative exceptions including means for detecting a speculative instruction which causes an exception condition;

means for storing an address of said speculative instruction and an exception bit in response to said exception condition;

means for storing one or more operands of said speculative instruction in response to said exception condition along with associated an associated exception bit(s);

means for resolving speculative exceptions when a non-speculative instruction uses an operand having an associated exception bit set by correcting for said exception condition and re-executing only said speculative instruction using said stored at least one operand and any speculative instructions that are dependent on said speculative instruction using said stored at least one operand.

14. The apparatus of claim 13, wherein said means for tracking includes means for tracking original speculative exceptions and also secondary speculative exceptions which occur when a speculative instruction attempts to use as an operand a value having an associated exception bit set.

15. The apparatus of claim 13, wherein said means for tracking speculative exceptions includes a) means for tracking original speculative exceptions including
   i. means for setting an exception bit in an exception bit file associated with a first target register in a register file in response to said exception condition;
   ii. means for setting the first target register to point at the address of the speculative instruction; and
   iii. means for storing in an extra register in an extra register file at least one operand, if any, of the speculative instruction and storing in an extra exception bit file the exception bit; and b) means for tracking secondary speculative exception(s) when a speculative instruction attempts to use a register having its exception bit set, including
   i. means for setting an exception bit in an exception bit file associated with a second target register in a register file in response to said exception condition;
   ii. means for setting the second target register to point at the address of the speculative instruction; and
   iii. means for setting the contents of the extra register of the extra register file to the register number of the operand in the speculative instruction rather than the register's contents, and setting the exception bit of the extra exception bit file to allow tracing back to the speculative instruction causing the original speculative exception for its resolution.

16. The apparatus of claim 13, wherein an initial condition for execution of the apparatus includes marking all instructions as non-speculative, but marking as speculative instructions which are moved above a conditional branch which

18 determines whether the instruction will be executed in a taken path of the sequential code.

17. The apparatus of claim 13 wherein the sequential code is comprised of RISC instructions organized in a very long instruction word format.

18. A method for handling speculative instructions, comprising the steps of:
   speculatively executing one or more instructions;
   identifying each exception caused by the speculatively-executed instructions;
   resolving each speculative exception caused by a speculatively-executed instruction that is subsequently non-speculatively executed by correcting for an exception condition which causes the speculative exception and re-executing only the speculatively-executed instruction causing the speculative exception and any other speculatively-executed instructions that are dependent on the speculatively-executed instruction.

19. The method of claim 18, wherein the step of identifying includes identifying both original exceptions and also secondary exceptions which occur when a speculatively-executed instruction attempts to use as an operand a value having an identified exception.

20. The method of claim 18, wherein the step of identifying includes identifying both original exceptions and also secondary exceptions which occur when a speculatively-executed instruction attempts to use as an operand a value having an associated exception bit set.

21. The method of claim 18, wherein the step of identifying includes the steps of:
   identifying original speculative exceptions, including:
      maintaining a record of an exception condition;
      maintaining a record of the address of the speculatively executed instruction causing the exception condition;
      maintaining a record of at least one operand for the speculatively executed instruction causing the exception in association with the record of the exception condition.

22. The method of claim 21, wherein the step of identifying comprises the steps of:
   identifying secondary speculative exception(s) when a speculatively-executed instruction encounters a record of an exception condition, by the steps of:
      maintaining a record of the secondary exception condition;
      maintaining a record of the address of the speculatively executed instruction causing the secondary exception condition;
      maintaining a record of the address of at least one operand for the speculatively-executed instruction causing the secondary exception condition, and maintaining a record of the speculatively-executed instruction causing the original speculative exception for its resolution.

23. The method of claim 18, wherein the step of identifying includes the steps of:
   identifying original speculative exceptions including:
      i. setting an exception bit in an exception bit file associated with a first target register in a register file in response to an exception condition;
      ii. setting the first target register to point at the address of the speculatively-executed instruction; and
      iii. storing in an extra register in an extra register file at least one operand, if any, of the speculatively executed instruction and storing in an extra exception bit file the exception bit.

24. The method of claim 23, wherein the step of identifying includes the steps of:

identifying secondary speculative exception(s) when a speculatively-executed instruction attempts to use a register having its exception bit set by the steps of:
  i. setting an exception bit in an exception bit file associated with a second target register in a register file in response to said exception condition;
  ii. setting the second target register to point at the address of the speculatively-executed instruction; and
  iii. setting the contents of the extra register of the extra register file to the register number of the operand in the speculatively-executed instruction rather than the register's contents, and setting the exception bit of the extra exception bit file to allow tracing back to the speculatively-executed instruction causing the original speculative exception for its resolution.

25. The method of claim 18, wherein an initial condition for execution of the method includes marking as speculative any instructions which are moved above a conditional branch which determines whether the instruction will be executed in a taken path of the sequential code.

26. The method of claim 18, wherein the speculative exception is a page fault exception.

27. The method of claim 26, wherein the step of correcting for an exception condition comprises loading into memory a page containing a desired datum.

28. The method of claim 18, wherein the speculative exception is an arithmetic overflow.

29. The method of claim 18, wherein the speculative exception is an invalid address.

30. A method for handling speculative instructions, comprising the steps of:

speculatively executing one or more instructions;

identifying each exception caused by the speculatively-executed instructions; and resolving each speculative exception caused by a speculatively-executed instruction that is subsequently non-speculatively executed by correcting for an exception condition which causes the speculative exception and re-executing only the speculatively-executed instruction causing the speculative exception and any other speculatively-executed instructions that are dependent on the speculatively-executed instruction, wherein the step of identifying includes the steps of:
a) identifying original speculative exceptions including:
  i. setting an exception bit in an exception bit file associated with a first target register in a register file in response to an exception condition;
  ii. setting the first target register to point at the address of the speculatively-executed instruction; and
  iii. storing in an extra register in an extra register file at least one operand, if any, of the speculatively executed instruction and storing in an extra exception bit file the exception bit;
b) identifying secondary speculative exception(s) when a speculatively-executed instruction attempts to use a register having its exception bit set by the steps of:
  i. setting an exception bit in an exception bit file associated with a second target register in a register file in response to said exception condition;
  ii. setting the second target register to point at the address of the speculatively-executed instruction; and
  iii. setting the contents of the extra register of the extra register file to the register number of the operand in the speculatively-executed instruction rather than the register's contents, and setting the exception bit of the extra exception bit file to allow tracing back to the speculatively-executed instruction causing the original speculative exception for its resolution.

31. A method for handling speculative instructions, comprising the steps of:

speculatively-executing one or more instructions;

identifying each original speculative exception occurring responsive to a speculatively-executed instruction encountering an exception condition;

identifying each secondary speculative exception occurring responsive to a speculatively-executed instruction encountering one of the identified original exceptions;

resolving each original speculative exception and each secondary speculative exception associated with a speculatively-executed instruction that is subsequently non-speculatively executed by correcting for the exception conditions and re-executing only the speculatively-executed instructions causing the original speculative exceptions and any speculatively-executed instructions that are dependent on the speculatively-executed instructions causing the original speculative exceptions.

32. The method of claim 31, wherein the step of identifying includes the steps of:
a) identifying original speculative exceptions, including:
  maintaining a record of an exception condition;
  maintaining a record of the address of the speculatively executed instruction causing the exception condition;
  maintaining a record of at least one operand for the speculatively executed instruction causing the exception in association with the record of the exception condition; and
b) identifying secondary speculative exception(s) when a speculatively-executed instruction encounters a record of an exception condition, by the steps of:
  maintaining a record of the secondary exception condition;
  maintaining a record of the address of the speculatively executed instruction causing the secondary exception condition;
  maintaining a record of the address of at least one operand for the speculatively-executed instruction causing the secondary exception condition, and maintaining a record of the speculatively-executed instruction causing the original speculative exception for its resolution.

33. The method of claim 31, wherein:
a) the step of identifying each original speculative exception includes the steps of:
  i. setting an exception bit in an exception bit file associated with a first target register in a register file in response to an original exception condition;
  ii. setting the first target register to point at the address of the speculatively-executed instruction associated with the original exception condition; and
  iii. storing in an extra register in an extra register file at least one operand, if any, of the associated speculatively-executed instruction and storing in an extra exception bit file the exception bit; and
b) the step of identifying each secondary speculative exception includes the steps of:

i. setting an exception bit in an exception bit file associated with a second target register in a register file in response to a secondary exception condition;

ii. setting the second target register to point at the address of the speculatively-executed instruction associated with the secondary exception condition; and iii. setting the contents of the extra register of the extra register file to the register number of the operand in the speculatively-executed instruction associated with the secondary exception condition rather than the register's contents, and setting the exception bit of the extra exception bit file to allow tracing back to the speculatively-executed instruction causing the original speculative exception for its resolution.

34. The method of claim 31, wherein an initial condition for execution of the method includes marking all instructions non-speculative, but marking as speculative any instructions which are moved above a conditional branch which determines whether the instruction will be executed in a taken path of the sequential code.

35. The method of claim 31, wherein the speculative exception is a page fault exception.

36. The method of claim 35, wherein the step of resolving the speculative exception comprises loading into memory a page containing a desired datum.

37. The method of claim 31, wherein the speculative exception is an arithmetic overflow.

38. The method of claim 31, wherein the speculative exception is an invalid address.

39. An apparatus for handling speculative instructions, comprising:

means for speculatively executing one or more instructions;

means for identifying each exception caused by the speculatively-executed instructions;

means for resolving each speculative exception caused by a speculatively-executed instruction that is subsequently non-speculatively executed by correcting for an exception condition which causes the speculative exception and re-executing only the speculatively-executed instruction causing the speculative exception and any other speculatively-executed instructions that are dependent on the speculatively-executed instruction.

40. The apparatus of claim 39, wherein the means for identifying includes means for identifying both original exceptions and also secondary exceptions which occur when a speculatively-executed instruction attempts to use as an operand a value having an identified exception.

41. The apparatus of claim 39, wherein the means for identifying includes means for identifying both original exceptions and also secondary exceptions which occur when a speculatively-executed instruction attempts to use as an operand a value having an associated exception bit set.

42. The apparatus of claim 39, wherein the means for identifying includes:

means for identifying original speculative exceptions, including:

means for maintaining a record of an exception condition;

means for maintaining a record of the address of the speculatively executed instruction causing the exception condition;

means for maintaining a record of at least one operand for the speculatively executed instruction causing the exception in association with the record of the exception condition.

43. The apparatus of claim 42, wherein the means for identifying comprises:

means for identifying secondary speculative exception(s) when a speculatively-executed instruction encounters a record of an exception condition, further comprising:

means for maintaining a record of the secondary exception condition;

means for maintaining a record of the address of the speculatively executed instruction causing the secondary exception condition;

means for maintaining a record of the address of at least one operand for the speculatively-executed instruction causing the secondary exception condition, and for maintaining a record of the speculatively-executed instruction causing the original speculative exception for its resolution.

44. The apparatus of claim 39, wherein the means for identifying includes:

means for identifying original speculative exceptions including:

i. means for setting an exception bit in an exception bit file associated with a first target register in a register file in response to an exception condition;

ii. means for setting the first target register to point at the address of the speculatively-executed instruction; and iii. means for storing in an extra register in an extra register file at least one operand, if any, of the speculatively executed instruction and for storing in an extra exception bit file the exception bit.

45. The apparatus of claim 44, wherein the means for identifying includes:

means for identifying secondary speculative exception(s) when a speculatively-executed instruction attempts to use a register having its exception bit set, further comprising:

i. means for setting an exception bit in an exception bit file associated with a second target register in a register file in response to said exception condition;

ii. means for setting the second target register to point at the address of the speculatively-executed instruction; and iii. means for setting the contents of the extra register of the extra register file to the register number of the operand in the speculatively-executed instruction rather than the register's contents, and for setting the exception bit of the extra exception bit file to allow tracing back to the speculatively-executed instruction causing the original speculative exception for its resolution.

46. The apparatus of claim 39, further comprising means for, as an initial condition, marking as speculative any instructions which are moved above a conditional branch which determines whether the instruction will be executed in a taken path of the sequential code.

47. The apparatus of claim 39, wherein the speculative exception is a page fault exception.

48. The apparatus of claim 47, wherein the means for resolving the speculative exception comprises means for loading into memory a page containing a desired datum.

49. The apparatus of claim 39, wherein the speculative exception is an arithmetic overflow.

50. The apparatus of claim 39, wherein the speculative exception is an invalid address.

51. An apparatus for handling speculative instructions, comprising:

means for speculatively executing one or more instructions;

means for identifying each exception caused by the speculatively-executed instructions; and means for resolving each speculative exception caused by a speculatively-executed instruction that is subsequently non-speculatively executed by correcting for an exception condition which causes the speculative exception and re-executing only the speculatively-executed instruction causing the speculative exception and any other speculatively-executed instructions that are dependent on the speculatively-executed instruction, wherein the means for identifying includes:

a) means for identifying original speculative exceptions including:
  i. means for setting an exception bit in an exception bit file associated with a first target register in a register file in response to an exception condition;
  ii. means for setting the first target register to point at the address of the speculatively-executed instruction; and
  iii. means for storing in an extra register in an extra register file at least one operand, if any, of the speculatively executed instruction and for storing in an extra exception bit file the exception bit;

b) means for identifying secondary speculative exception(s) when a speculatively-executed instruction attempts to use a register having its exception bit set, including:
  i. means for setting an exception bit in an exception bit file associated with a second target register in a register file in response to said exception condition;
  ii. means for setting the second target register to point at the address of the speculatively-executed instruction; and
  iii. means for setting the contents of the extra register of the extra register file to the register number of the operand in the speculatively-executed instruction rather than the register's contents, and for setting the exception bit of the extra exception bit file to allow tracing back to the speculatively-executed instruction causing the original speculative exception for its resolution.

52. An apparatus for handling speculative instructions, comprising:
  means for speculatively-executing one or more instructions;
  means for identifying each original speculative exception occurring responsive to a speculatively-executed instruction encountering an exception condition;
  means for identifying each secondary speculative exception occurring responsive to a speculatively-executed instruction encountering one of the identified original exceptions;
  means for resolving each original speculative exception and each secondary speculative exception associated with a speculatively-executed instruction that is subsequently non-speculatively executed by correcting for the exception conditions and re-executing only the speculatively-executed instructions causing the original speculative exceptions and any speculatively-executed instructions that are dependent on the speculatively-executed instructions causing the original speculative exceptions.

53. The apparatus of claim 52, wherein the means for identifying includes:
a) means for identifying original speculative exceptions, including:
  means for maintaining a record of an exception condition;
  means for maintaining a record of the address of the speculatively executed instruction causing the exception condition;
  means for maintaining a record of at least one operand for the speculatively executed instruction causing the exception in association with the record of the exception condition; and b) means for identifying secondary speculative exception(s) when a speculatively-executed instruction encounters a record of an exception condition, including:
  means for maintaining a record of the secondary exception condition;
  means for maintaining a record of the address of the speculatively executed instruction causing the secondary exception condition;
  means for maintaining a record of the address of at least one operand for the speculatively-executed instruction causing the secondary exception condition, and for maintaining a record of the speculatively-executed instruction causing the original speculative exception for its resolution.

54. The apparatus of claim 52, wherein:
a) the means for identifying each original speculative exception includes:
  i. means for setting an exception bit in an exception bit file associated with a first target register in a register file in response to an original exception condition;
  ii. means for setting the first target register to point at the address of the speculatively-executed instruction associated with the original exception condition; and
  iii. means for storing in an extra register in an extra register file at least one operand, if any, of the associated speculatively-executed instruction and for storing in an extra exception bit file the exception bit; and b) the means for identifying each secondary speculative exception includes:
  i. means for setting an exception bit in an exception bit file associated with a second target register in a register file in response to a secondary exception condition;
  ii. means for setting the second target register to point at the address of the speculatively-executed instruction associated with the secondary exception condition; and
  iii. means for setting the contents of the extra register of the extra register file to the register number of the operand in the speculatively-executed instruction associated with the secondary exception condition rather than the register's contents, and for setting the exception bit of the extra exception bit file to allow tracing back to the speculatively-executed instruction causing the original speculative exception for its resolution.

55. The apparatus of claim 52, further comprising means for marking, as an initial condition, as speculative any instructions which are moved above a conditional branch which determines whether the instruction will be executed in a taken path of the sequential code.

56. The apparatus of claim 52, wherein the speculative exception is a page fault exception.

57. The apparatus of claim 56, wherein the means for resolving the speculative exception comprises means for loading into memory a page containing a desired datum.

58. The apparatus of claim 52, wherein the speculative exception is an arithmetic overflow.

59. The apparatus of claim 52, wherein the speculative exception is an invalid address.

* * * * *

UNITED STATES PATENT AND TRADEMARK OFFICE
CERTIFICATE OF CORRECTION

PATENT NO. : 5,799,179
DATED : Aug. 25, 1998
INVENTOR(S) : Ebcioglu et al.

It is certified that error appears in the above-identified patent and that said Letters Patent is hereby corrected as shown below:

Column 15, line 11, Claim 3 should read,
--tion and storing in an extra exception bit file the--

Column 21, lines 23,25, Claim 36 should read
-- 36. The method of claim 35, wherein the step of correcting comprises loading into memory a page containing a desired datum. --

Signed and Sealed this

Twenty-second Day of December, 1998

Attest:

BRUCE LEHMAN

*Attesting Officer*   *Commissioner of Patents and Trademarks*